Oct. 4, 1932.  H. D. ELSE  1,880,936
HIGH SPEED MOTOR
Filed Feb. 28, 1931
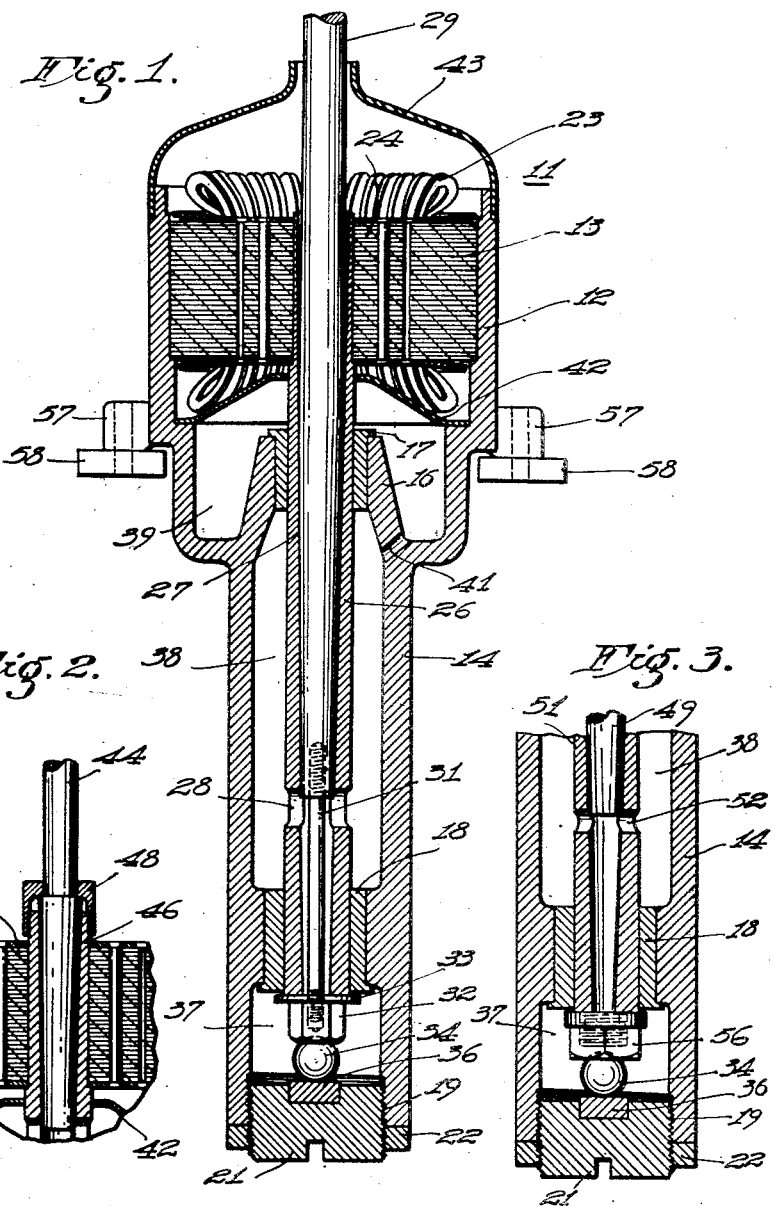
INVENTOR
Harry D. Else.
BY
ATTORNEY
WITNESSES.

Patented Oct. 4, 1932

1,880,936

UNITED STATES PATENT OFFICE

HARRY D. ELSE, OF SPRINGFIELD, MASSACHUSETTS, ASSIGNOR TO WESTINGHOUSE ELECTRIC & MANUFACTURING COMPANY, A CORPORATION OF PENNSYLVANIA

HIGH SPEED MOTOR

Application filed February 28, 1931. Serial No. 518,985.

My invention relates to motors and particularly to high-speed vertical-shaft motors.

An object of my invention is to provide a relatively simple frame structure for a vertical-shaft electric motor, embodying a minimum number of parts.

Another object of my invention is to provide a relatively simple and easily assembled and disassembled vertical-shaft motor.

Another object of my invention is to provide a tubular shaft for the rotor of a vertical-shaft motor having a solid spindle therein, with means associated therewith for holding the spindle tightly in a conical seat within the tubular shaft, and means for easily and quickly removing said spindle.

In practicing my invention, I provide a single-piece metal structure for holding and supporting two spaced bearings, as well as a step bearing and a stator structure, a tubular rotor shaft, a portion of the interior opening of which is of conical shape, together with a spindle having interfitting engagement with the tubular shaft over its conical lower end, and means for clamping the spindle in the tubular shaft. The tubular shaft is provided with an opening therethrough to permit of inserting a spindle-removing drift or pin. A step bearing, including a hardened steel ball, is provided for the vertical shaft.

In the single sheet of drawing,

Figure 1 is a view, in vertical section through a vertical-shaft motor embodying my invention, Fig. 2 is a fragmentary view, partially in vertical section, of a modified form of device embodying my invention, Fig. 3 is a fragmentary view of a still further modification of a device embodying my invention, Figs. 4 and 5 are views, in side and in end elevation, respectfully, of a drift to be used in removing a spindle, and, Figs. 6 and 7 are views, in side and in end elevation, respectively, of a spindle-removing pin.

Referring to Fig. 1 of the drawing, I have there illustrated a vertical-shaft motor 11 which, for convenience, may be considered as being of the alternating-current induction type and which includes a single-piece housing 12 which is made of relatively large internal diameter at its upper end portion to receive a stator structure 13 of the usual kind employed in alternating-current motors.

The lower portion 14 of housing 12 is of lesser diameter and has an inner collar 16 within which is secured a sleeve bearing 17. A second sleeve bearing 18 is secured to a lower portion of part 14, as by a press fit therein. The extreme lower end portion of part 14 is provided with internal screw threads 19, and a step-bearing-support 21 has screw-threaded engagement therein, and may be held in any desired adjusted position by a suitable lock nut 22.

I have not illustrated or described, in detail, the construction of the stator 13, but it will be understood that it includes a plurality of magnetizable laminations held together by any suitable means, and a plurality of stator energizing coils 23, all in a manner well known in the art. The upper portion of unitary member 12 may be provided with a shoulder, as shown in the drawing, to properly locate the stator structure.

A rotor 24 is mounted on a tubular shaft 26, the aperture through which may be of substantially cylindrical shape, at the upper portion thereof, and is then conically decreased from about the point indicated by numeral 27 to the point at which opening 28 extends laterally therethrough, the portion below the opening 28 being either cylindrical or slightly tapered, as may be found desirable in manufacturing the tubular shaft. A spindle 29, which is relatively small in diameter and the lower end of which is conically decreased in diameter, fits into the tubular shaft 26 with a tight fit. While it is within the province of my invention to depend entirely upon the driving fit obtained by reason of the weight of any driven member located on spindle 29 at its upper end (not shown in the drawing), I provide additional means for insuring a very tight fit. In Fig. 1 of the drawing, I have indicated this means as a stud 31, the upper screw-threaded end of which fits into an opening in the lower end of spindle 29 and the lower screw-threaded end of which fits into a hardened steel nut 32, a washer 33 being provided between the end of tubular shaft 26 and nut 32 in order to prevent jumping or hopping of the shaft or rotor structure upwardly when in operation.

A hardened steel ball 34 is provided, the upper portion of which fits into an arcuate part of the lower surface of nut 32 and rests upon a hardened steel insert 36 fitting into support 21.

A plurality of chambers 37, 38 and 39 are provided by the hereinbefore described housing, which may be filled with oil, and any suitable or desired means for insuring proper oiling of sleeve bearings 17 and 18 may be provided. An opening 41 provides communication between chambers 39 and 38. In order to prevent the throwing of oil, when the rotor is in operation, from chamber 39 upon the lower end of coils 23, I provide a resilient metal plate 42, of saucer-shape, having a central opening therethrough which provides a slight clearance around the tubular shaft 26. The upper end of member 12 is closed by a resilient sheet-metal member 43 of substantially inverted cup-shape which may be sprung over a shoulder portion at the upper edge of part 12.

Referring to Fig. 2 of the drawing, I have there illustrated another means for insuring a tight or close fit between a spindle 44, fitting into a tubular shaft 46, supporting a rotor 47. The securing and clamping means includes a member 48 of inverted cup shape, having a central opening therethrough, the intermediate portion fitting over a shoulder on spindle 44, the remaining portion being screw-threaded and engaging the upper screw-threaded outer surface of tubular shaft 46.

The shaft 44 may be relatively short and extend only down through the rotor 47, with a tapered lower end fitting into a correspondingly tapered axial hole in tubular shaft 46. That portion of the shaft structure below the nut 48 will be relatively rigid and the shaft 44 above the nut 48 may have some flexibility, the amount of which may be varied by varying the diameter of the shaft.

Referring to Fig. 3 of the drawing, I have there shown a spindle 49 fitting within a tubular shaft 51 which has a substantially circular opening 52 extending laterally therethrough. In this case, the interfitting engagement necessary to effect driving operation of spindle 49 by tubular shaft 51 is obtained by the tight fit alone, no other securing means being provided. In all other respects, the elements of Fig. 3 are substantially the same as those shown in Fig. 1 of the drawing.

If it becomes necessary to remove a broken spindle 29, a drift 53 (see Fig. 5) may be used after stud 31 has been removed. To do this, it may be necessary to remove support 21, after which the nut 32 can be loosened a few turns and then hammered, by proper means, to drive the remaining portion of spindle 29 upwardly to loosen the same, or the stud 31 may be removed entirely, after which the rotor structure may be removed from the frame, and the drift pin 53 inserted in oblong opening 28.

When an opening 52 of substantially circular shape is provided, a pin 65 (see Fig. 6) may be used, which is of substantially circular shape but with a flattened portion and a square head. After removing nut 56 from the lower end of tubular shaft 51, the rotor structure may be removed vertically upwardly, and the pin 54 inserted with its flat portion beneath the lower end of spindle 49 and then turned to loosen the spindle.

The device embodying my invention thus provides a unitary frame or casing structure which may be provided with a plurality of supporting feet 57. Flat washers 58, of cork, rubber or other resilient material, or springs, may be located between the feet 57 and a support therefor. The frame supports a pair of aligned bearings, located below a stator and rotor structure, the stator structure being also supported by the unitary casing. A resilient sheet-metal member covers the oil-holding chamber to prevent the stator and the rotor from being sprayed with oil during operation of the device. The casing is closed at the top by a resilient thin-metal sheet which may be easily and quickly removed in case of necessity.

The tubular rotor shaft has a spindle interfitting therewith by a portion of conical shape which may be relied upon to provide the proper power-transmitting connection between these two portions but, if desired, additional clamping or securing means may be provided to increase the tight fit between the two portions.

Various modifications may be made in the device embodying my invention without departing from the spirit and scope, and I desire, therefore, that only such limitations shall be placed upon my invention as are imposed by the prior art or are set forth in the appended claims.

I claim as my invention:

1. In a vertical-shaft motor having a stator and a rotor, a tubular rotor shaft having a portion of its interior of conical shape, and an upwardly extending solid shaft within the tubular rotor shaft and having its lower end of conical shape to fit tightly within the tubular shaft portion of conical shape.

2. A vertical-shaft motor having a stator and a rotor, a tubular rotor shaft having an axial opening therein, the upper and major portion of the length of the opening being of uniform diameter, and the minor lower portion being of conical shape and a solid shaft within the tubular rotor shaft and having its lower end of conical shape to fit tightly within the lower portion axial opening of conical shape.

3. In a vertical-shaft motor having a stator and a rotor, a tubular rotor-supporting shaft having a portion of its interior of conical shape, a solid shaft having a conical-shaped lower end fitting into the tubular rotor-supporting shaft, and means coaxial with the two shafts and engaging the solid shaft for securing it tightly in the tubular shaft.

4. In a vertical-shaft motor including a stator, a rotor and a rotor shaft, a pair of spaced bearings for the rotor shaft below the rotor, a single-piece casing surrounding and supporting both bearings and the stator, an enlarged oil reservoir at the top of the casing below the stator and the rotor, and a sheet-metal plate within the casing below the stator to prevent oil from said reservoir reaching said stator.

5. In a vertical-shaft motor including a stator, a rotor and a rotor shaft, a pair of spaced bearings for the rotor shaft below the rotor, a single-piece casing surrounding and supporting both bearings and the stator, and a sheet-metal cover for the rotor and stator resiliently fitted on the upper edge of the casing.

6. In a vertical-shaft motor having a stator and a rotor, a tubular rotor-supporting shaft, a solid shaft having a lower tapered end fitting into a cooperating portion of the tubular shaft, said tubular shaft having a lateral opening therethrough below the lower end of the solid shaft, a stud engaging the lower end of the solid shaft and extending below the lower end of the tubular shaft, and a nut engaging the extending end of the stud to draw the solid shaft into tight-fitting engagement in said tubular shaft.

7. A vertical shaft motor including a stator and a rotor, a tubular shaft at the upper end of which the rotor is fixed, a transverse opening in the tubular shaft intermediate its ends, a solid shaft in and interfitting with the tubular shaft and extending to the transverse opening and removable therefrom by means insertable in the transverse opening.

8. A device as set forth in claim 1 and including a guide bearing, a step bearing member and means associated with the tubular shaft for preventing excessive vertical movement of the tubular shaft.

9. A vertical motor comprising a stator and a rotor, a tubular shaft at the upper end of which the rotor is fixed, a bearing for the tubular shaft below the rotor, a spindle having a tapered lower end fitting tightly in a correspondingly shaped portion of the tubular shaft below the rotor and having its upper end portion fitting loosely in the tubular shaft at that portion thereof engaging the rotor.

10. In a vertical motor comprising a stator, a housing for the stator, a bearing in the housing below the stator, a tubular shaft in the bearing having the lower portion of its interior of conical shape, a rotor on the upper end of the tubular shaft, and a solid spindle in the tubular shaft fitting tightly in the conical portion thereof and loosely in the upper end portion of the tubular shaft.

In testimony whereof, I have hereunto subscribed my name this sixteenth day of February, 1931.

HARRY D. ELSE.